June 9, 1931. G. F. CROESSANT 1,808,918
CONVEYER MECHANISM
Filed Aug. 8, 1927 2 Sheets-Sheet 1
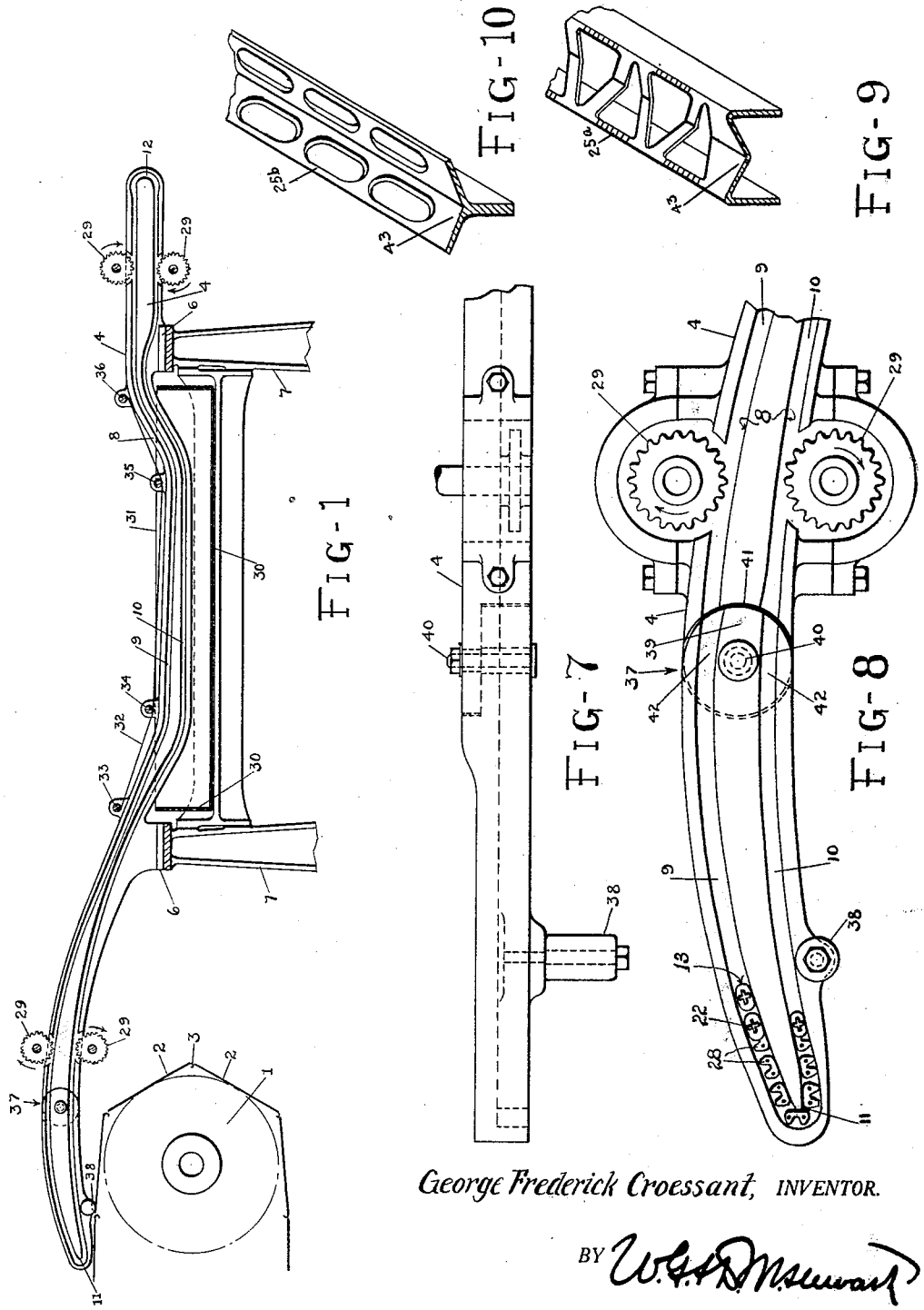
George Frederick Croessant, INVENTOR.
BY *W.G.H.D.Stewart*
ATTORNEYS.

June 9, 1931. G. F. CROESSANT 1,808,918
CONVEYER MECHANISM
Filed Aug. 8, 1927   2 Sheets-Sheet 2
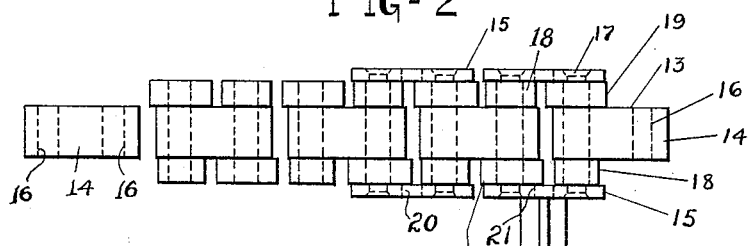
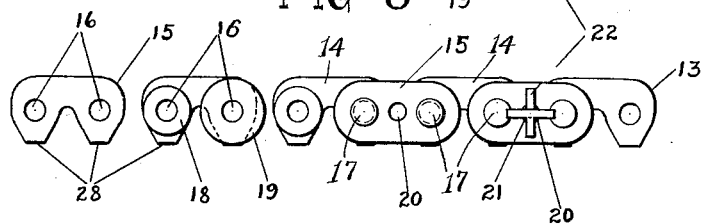
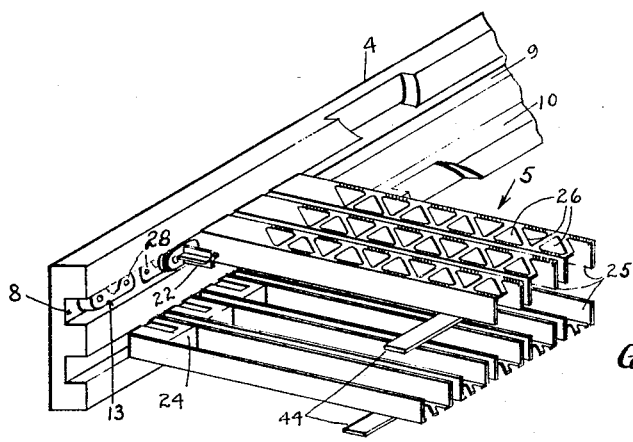
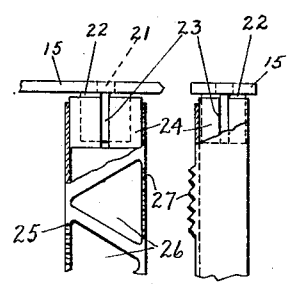
George Frederick Croessant
INVENTOR.
BY
ATTORNEYS.

Patented June 9, 1931

1,808,918

UNITED STATES PATENT OFFICE

GEORGE FREDERICK CROESSANT, OF WYOMISSING, PENNSYLVANIA

CONVEYER MECHANISM

Application filed August 8, 1927. Serial No. 211,522.

This invention relates to improvements in feeding mechanism for continuous baking ovens, and more particularly to novel means for feeding dough shapes unconfined by a retaining holder or pan, such as pretzels or the like, to a continuous baking oven of the type having an endless belt for feeding the dough through the oven.

The primary object of the invention is to provide a novel conveyer of the endless belt type adapted to receive the dough, progressively advance the same, and finally to deliver the dough to the conveyer of the oven.

Another object is to provide an endless conveyer including rack links engaged by gears employed to advance the conveyer.

A further object is to furnish feeding means of this general character, in which the feed belt chains move in endless guides, each guide having a pivoted extremity to permit one end of the conveyer to rise and fall as the plates of the oven belt advance into the oven.

Another object of the invention is to provide special chains as part of the conveyer; such chains including rollers to engage the endless guides and function as antifriction means for the chain.

Each chain embodies a special arrangement of links, designed to form a substantially straight rack bar to be engaged by the gears employed in feeding the chains.

A still further object of the invention is to furnish transverse bars of novel construction, such bars being preferably formed of stamped sheet metal, the stamping being of open work formation, and provided with teeth to engage the articles to be transported.

A further object is to provide means for dipping the articles into a cooking or treating bath before introducing the same into the oven.

With the foregoing objects outlined and with other objects in view which will appear as the description proceeds, my invention consists in the novel features hereinafter set forth in detail, illustrated in the accompanying drawings, and more particularly pointed out in the appended claims.

Referring to the drawings,

Fig. 1 is a longitudinal vertical sectional view of my improved feeding means.

Fig. 2 is a top plan view of a portion of one of the chains forming part of the conveyer.

Fig. 3 is a side view of the elements shown in Fig. 2.

Fig. 4 is a top plan view, partly broken away, of one of the conveyer bars, and the means employed in attaching it to one of the chains.

Fig. 5 is a side view of the same.

Fig. 6 is an enlarged detail perspective view of a portion of the feeding mechanism.

Fig. 7 is a top plan view of one of the side bars of the conveyer frame, and illustrating the means employed in pivotally connecting one end of a side bar to the remainder of the bar.

Fig. 8 is a side view of the same.

Figs. 9 and 10 show fragmentary perspective views of modifications of the transverse bars of the feeding mechanism.

In the drawings, 1 indicates a feeding wheel adapted to be arranged at one end of a continuous oven, for guiding or moving an endless conveyer 2 through the oven, and as illustrated, this endless conveyer is made up of transverse plates pivotally connected together as shown at 3; the whole constituting a receiving platform or support for articles delivered thereto as will hereinafter appear.

Continuous ovens employing such endless conveyers are well known, and it is believed unnecessary to further illustrate or describe such structure.

The novel feeding means which I use with such an oven, consists primarily of a pair of side bars 4, only one of which is shown, and an endless belt.

These side bars have legs 6 which rest on a table or supporting frame 7, and each side bar has an endless groove or run-way 8, formed of substantially parallel portions 9 and 10, connected together at the ends by return-bends 11 and 12.

An endless chain 13 is arranged in each groove, and is made up, as best shown in Figs. 2 and 3, of toothed links 14, and plain links 15. The links 14 are arranged in endless series, and each link has a pair of apertures 16 to receive connecting pins 17, which pivotally connect the links 14 to the links 15. Each pin carries a spacing collar 18, and an anti-friction roller 19, the collars and rollers alternating at each side of the chain, whereby a roller will be arranged near one end of one pin, and near the opposite end of an adjacent pin.

As the chain moves along in its guide groove 8, the rollers 19 will engage opposite sides of the groove and roll on the same, and this will reduce the friction as the chain moves in its groove.

Each of the plain links 15 has an aperture 20, forming a journal for a small stub shaft 21 which is united with a plural armed or cruciform connecting element 22. The latter is inserted in a cruciform slot or recess 23 in a block 24 arranged at one end of a transverse conveyer bar or platform 25.

Each of these bars preferably consists of a channel shaped sheet metal stamping, perforated as shown at 26, to provide triangular apertures. At the base of each triangle, the edge of the metal is toothed, as shown at 27, such teeth providing means for preventing the dough from shifting on these supporting plates while the dough is being fed.

As each of the transverse supporting bars of the conveyer is of channel shape, the blocks 24 are simply inserted into the ends of the channel, and obviously, the blocks at each end of a bar will receive a pair of the connecting elements 22, pivotally mounted in corresponding links of the opposed chains.

It is customary in driving endless belts and the like, to drive at the bends by means of gears engaging the inner side of the belt, but such a construction is not feasible in feeding mechanism for continuous baking ovens, as it is necessary that the bends be relatively sharp, to permit the dough to be fed directly on to the endless hearth of the oven without falling any material distance. Therefore, in my improved conveying mechanism, I make the bends 11 and 12 relatively sharp, and drive the chains from points intermediate the ends of the side bars, and from the outside of the chains instead of from the inside. It may be seen from Fig. 6, that the teeth 28 of the chains project outwardly, and while they are traveling through the substantially parallel portions of the grooves, these teeth in effect form rack bars which are engaged by positively driven gears 29, which may be actuated by any suitable means not shown. The gears move in the direction of the arrows, and as these gears rotate, the upper run of my improved conveyer will support and feed dough shapes and the like forwardly, and such dough shapes will be gently deposited on the endless belt 2 of the oven.

In making pretzels and the like, it is desirable to pass the dough shapes through boiling lye, and for this purpose, the intermediate portions of the grooves in my invention dip downwardly, to permit the material being fed, to pass through boiling lye contained in a pan, made up of the bottom 30 and the sides 31.

To insure dipping of the material, and to prevent the same from floating, I have provided taut longitudinally extending wires 32, which are stretched along the intermediate portion of the feeding mechanism, and enengage cross bars 33, 34, 35 and 36.

To permit the forward extremities of the side bars to rise and fall to accommodate the pivoted plates of the endless hearth, such extremities are pivoted to the main portions of the side bars, as shown at 37, and each extremity is provided with a roller 38 which rolls on the plates of the hearth. As best shown in Figs. 7 and 8, each extremity has a semi-cylindrical inner end 39 which turns on a pivot pin 40 in a semi-cylindrical recess 41 at the end of the main portion of the side bar, and the portions of the grooves arranged on the semi-cylindrical part 39 are preferably flared slightly, as shown at 42, so as to permit ready passage of the chain, regardless of the swinging movement of the extremity of the side bar.

Instead of making the transverse bars 25 of the shape shown in Figs. 4, 5 and 6, such bars may be modified, as shown in Figs. 9 and 10. In this form of the invention, the channel bar 25a will be provided on its outer side with a longitudinal channel or groove 43 to receive pretzel sticks or the like.

The distance between the side bars 5 may be as great as desired or necessary, and if the conveyer is relatively wide, intermediate longitudinal rails 44 may be provided on the under side of the lower run of the belt, and between the runs of the belt. In such case, the transverse bars 25, as they move along, will slide on these intermediate rails and be partially supported thereby.

From the above description, it is believed that the construction, operation and advantages of the invention may be readily understood, and it is apparent that changes may be made in the details disclosed without departing from the spirit of the invention as expressed in the claims.

What I claim and desire to secure by Letters Patent is:

1. A conveyer mechanism including spaced side bars having endless runways consisting of upper and lower runs connected by return bends, said runs converging acutely to one of said bends, and an endless belt, the side edges of which are supported and guided by said runways; the belt being supported at said bends solely at its side edges.

2. A conveyer mechanism including spaced side bars having opposed endless runways including upper and lower portions connected by return bends adjacent the ends of the bars, said portions converging to one bend at an acute angle, an endless belt traveling said runways and having at its edges outwardly extending teeth, and means midway of the ends of the bars in driving engagement with said teeth.

3. A conveyer mechanism comprising spaced side frames having opposed endless runways, each runway consisting of substantially parallel intermediate portions and relatively sharp return-bend portions, link belt chains freely movable in said ways and provided with outwardly extending teeth, transverse platform members engaging opposite links of the respective chains, driving means for said chains arranged at the intermediate portions of said runways and engaging said teeth, each chain including toothed and plain links, pins connecting said links, and anti-friction rollers arranged on said pins, certain of the rollers being arranged near one end of their respective pins, and the other rollers being located near the opposite ends of their respective pins.

4. In conveyer mechanism, a chain member and a platform member, a cruciform element connected to one of said members, and an element connected to the other one of said members, and having a cruciform slot receiving said cruciform element.

5. A conveyer mechanism including a link chain, a cruciform element pivotally connected to said chain, a transverse platform member, and a block connected to the platform member and having a cruciform slot to receive said cruciform member.

6. A conveyer mechanism comprising spaced side frames having opposed endless runways, chains freely movable in said ways, transverse platform members connected to said chains, each of said members comprising a channel-shaped bar provided with projecting means to carry material along with the bar, and driving means for said chains.

7. A conveyer mechanism comprising spaced side bars, having opposing endless grooves constituting runways having return bends adjacent one end of the bars; an endless platform, pivotally connected links secured to the side edges thereof and riding in said runways; the radius of the inner edge of the grooves at the bends being less than the distance between the pivotal points of any one of the links.

In testimony whereof I affix my signature.
GEORGE FREDERICK CROESSANT.